United States Patent [19]

Mathes

[11] 4,197,204
[45] Apr. 8, 1980

[54] DEVICE FOR THE SEPARATION OF IMMISCIBLE LIQUID MIXTURES

[75] Inventor: Nikolaus Mathes, Breuberg, Fed. Rep. of Germany

[73] Assignee: Akzona Incorporated, Asheville, N.C.

[21] Appl. No.: 901,891

[22] Filed: May 1, 1978

[30] Foreign Application Priority Data

Feb. 13, 1978 [DE] Fed. Rep. of Germany ....... 2721124

[51] Int. Cl.² .............................................. B01D 17/02
[52] U.S. Cl. .................................. 210/242 S; 210/359; 210/433 M; 210/455; 210/538; 210/540; 210/DIG. 5; 210/DIG. 26
[58] Field of Search ................ 156/167, 181; 428/219, 428/222, 293, 338, 371; 210/23 R, 73 W, 242 S, 433 R, 455, 483, 484, 491, 497 R, 500 R, 503, 508, 538, 540, DIG. 5, DIG. 26, 359

[56] References Cited

U.S. PATENT DOCUMENTS

| | | | |
|---|---|---|---|
| 3,347,391 | 10/1967 | Steensen | 210/508 |
| 3,442,392 | 5/1969 | Skelley | 210/491 |
| 3,450,632 | 6/1969 | Olson et al. | 210/491 |
| 3,667,608 | 6/1972 | Burroughs et al. | 210/DIG. 26 |
| 3,669,275 | 6/1972 | Downs | 210/242 |
| 3,691,004 | 9/1972 | Werner et al. | 156/167 X |

*Primary Examiner*—Frank A. Spear, Jr.
*Assistant Examiner*—Ferris H. Lander
*Attorney, Agent, or Firm*—Francis W. Young; Jack H. Hall

[57] ABSTRACT

A tubular device for separating liquid-liquid systems, said device having at least one slot covered with a sheet structure permeable to only one of the liquids, a collecting means for the separated liquid and means for reinforcing the tubular device to prevent compression or collapse thereof.

8 Claims, 12 Drawing Figures

DEVICE FOR THE SEPARATION OF IMMISCIBLE LIQUID MIXTURES

BACKGROUND OF THE INVENTION

The invention relates to devices suitable for use in a process for the separation of mixtures of liquids insoluble in each other, especially oil-like liquids and water, wherein the liquid mixture is brought into contact, under static liquid pressure without application of additional pressure, with one side of a sheet structure consisting of fibers or filaments permeable to only one of the liquids, whereby one of the liquids passes through the sheet structure, and the liquids are collected and/or drained off separately such as shown in copending application Ser. No. 870,257 filed Jan. 17, 1978.

According to said application, sheet structures of different materials such as fiber nonwovens, woven fabrics, knitted fabrics and even unsized papers can be used, provided they meet the requirement that they be permeable to only one of the liquids to be separated and furthermore that their strength and dimensional stability be sufficient for the intended end-uses. Suitable for this purpose are fiber nonwovens, for example, special paper machine nonwovens made of a mixture of 0-80 weight percent viscose fibers, 0-90 weight percent synthetic fibers, including at least 50 weight percent fibers with a high shrinkage capacity of at least 25%, 5-50 weight percent bonding fibers and 0-50 weight percent cellulose, which are consolidated by thermal treatment of the wet nonwoven, woven or knitted fabrics.

All known synthetic textile fibers, such as polyamides, polyesters, polyacrylonitrile, polyolefins, etc. can be used. Fibers obtained by spinning polymers at high draw-off speeds can be used as the high-shrinkage constituent, which may be composed of a copolyamide of 20% nylon salt and 8% caprolactam. Copolyamide fibers of 40% nylon salt and 60% caprolactam, which soften or melt in the presence of water at relatively low temperatures are suitable as bonding fibers.

Other essential features of the prior process are described in said copending application and are incorporated herein by reference.

As used herein, a sheet structure is considered permeable to a liquid, when such liquid, under operating conditions, i.e. under the static pressure exerted by such liquids on the sheet structure, passes through the sheet structure.

It is also possible to use sheet structures which when tested, as described in said application are permeable to both liquids but become impermeable to one liquid by being impregnated with the other liquid before use. In this case, the permeability measurement is performed with a previously soaked sheet structure. For instance, a sheet structure which in the "dry" stage is permeable both to water and oil can be first impregnated with water to make it impermeable to oil. For long-term use, it is, of course, necessary that the material never dry out.

To carry out the process of the copending application, it was found especially expedient to use a device comprising a tubular or pipe-shaped structure laid out across the direction of flow of the stream and provided over its entire length with a discontinuous slit, the width of the slit extending from above the liquid surface to below the contamination boundary. The slit was closed off by a sheet structure permeable to only one of the liquids to be separated and a collecting area is provided within the structure for the passing liquid.

The device may be anchored in the stream by means of floats, e.g. air hoses within the oil barrier, and moorings or the like.

The tubular, external covering of the device can be made of any suitable material impermeable to liquids, e.g. a plastic such as PVC or a plastic-laminated textile sheet structure. As material for the sheet structure which according to the invention is only permeable to e.g. the oil-like liquid to be separated but not to the other, e.g. water, use is preferably made of special paper machine nonwovens, as described in e.g. U.S. Pat. No. 3,394,047. Permeability or impermeability is determined under simulation of actual end-use conditions by DIN standards 53886. Such sheet structures are considered suitable for specific end-use purposes which under operational pressure conditions are permeable to one but not to the other liquid.

The version of the device illustrated in FIG. 3 of the copending application has been found eminently suitable whenever the flow rate of the open channel to be decontaminated was relatively slow and even. However, higher flow rates and/or irregular flow patterns lead to local compression or collapsing of the device.

SUMMARY OF THE INVENTION

Consequently, it is an object of my invention, to provide a dimensionally stable device, which even under normal flow conditions encountered in rivers, canals, and other open channels will essentially retain its shape without impairing the flexibility of said device.

This objective is met by a device consisting of a tubular or pipe-shaped structure, laid out across the flow direction of a liquid stream and provided over its entire length with a discontinuous slit starting above the surface of the liquid and of a width dimensioned so that it ends essentially below the contamination boundary, whereby the slit is covered by a sheet structure permeable to only one of the liquids to be separated and whereby within the hose there is a collecting chamber for the passed liquid, characterized in that outside and/or inside the tubular or pipe-shaped structure bracing elements are aligned which prevent compression or collapsing of said structure.

These bracing elements may consist of circular elements installed at a distance from one another. To prevent collapsing in the longitudinal direction of the device, bracing elements can be aligned in said longitudinal direction. To prevent shifting of said bracing elements, they may be permanently connected to the tubular or pipe-shaped structure or loosely fastened to the latter by means of stationary rings, eyelets, loops, etc. For instance, the elements aligned in the longitudinal direction of the device can also be continuous ropes, i.e. matching the length of the device, which serve furthermore as moorings to anchor the device to the shore or the channel floor.

In many cases it is sufficient to provide only for circular bracing elements, preferably distributed uniformly over the length of the device, i.e. at equidistant locations. Collapsing of the device which may still take place at some points will generally impair the separating performance of the device much less than would the compression of the device occurring without the circular bracing elements.

An effective measure to prevent compression and collapsing of the device is to design the permeable sheet material to serve as the bracing element. This may be accomplished if the sheet material is formed in a hose of the same length as the device, having an outside diameter corresponding roughly to the inside diameter of the tubular or pipe-shaped structure. The hose is then inserted in the latter structure. It is also possible to combine a number of bracing elements, i.e. to align them simultaneously within or outside the tubular or pipe-shaped structure.

A very effective means for avoiding compression or collapsing of the tubular or pipe-shaped structure is to locate a bracing element inside said structure, which bracing element consists of a nonwoven element fitting the void of the device and/or filling it. The nonwoven element is composed of a plurality of intersecting, melt-spun polymer filaments deposited in loops, the filaments having a diameter of preferably 0.1 to 2 mm, and being superficially bonded at their points of intersection. Nonwoven elements which are suitable for this purpose and their method of manufacture are disclosed, for example, in Werner and Stapp, U.S. Pat. Nos. 3,691,004, 3,687,759 and 3,852,152, and Rasen et al, U.S. application Ser. No. 703,277, filed July 7, 1976. The bracing element can be given a circular, square, polygonal or other cross section, whereby the final profiling is accomplished either directly during melt-spinning or subsequently by molding, rolling up, folding, etc. of essentially such sheet-like nonwoven elements of plan or profiled surface. Moreover, these bracing elements can be designed as a continuous element matched to the length of the device, or may also be a combination of individual pieces of specific length and be thereby again aligned with or without lateral spacing. It is advantageous to provide spacers between said elements to limit lateral shifting of these bracing elements. The spacers can be of the same material as the bracing elements, and may be integral with said bracing elements. It is thus possible to design the bracing elements and spacers required for a device of a particular length as a one-piece element. A bracing element of helical or spiral shape was found eminently suitable, since it can be compressed to a small volume during transportation. An air hose inserted inside the device was also found suitable as bracing element, especially when said air hose had two different, sectionally or periodically alternating, diameters over its length, whereby the largest diameter of the air hose corresponds roughly to the inside diameter of the tubular or pipe-shaped structure. The entry ports provided for the liquids to be separated in the tubular or pipe-shaped structure are expediently located in the segments having the smaller air hose diameter. Furthermore, passages must be left open for lateral drainage of the separated liquid.

The size of the device is virtually limitless from a technological standpoint, but is generally within the range used for oil barriers.

DETAILED DESCRIPTION

Figure 1:
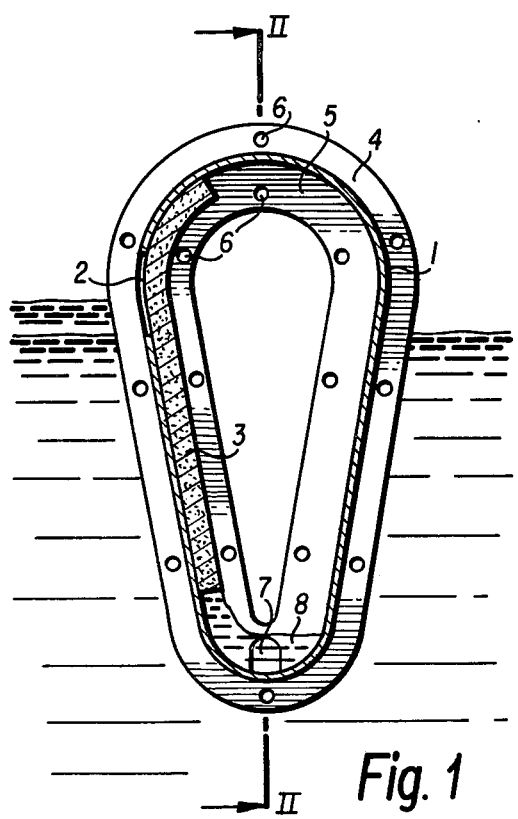
FIG. 1 is a lateral cross section of the device of the invention showing an arrangement of bracing elements within or outside the tubular or pipe-shaped structure.

In the device of the invention illustrated in FIG. 1, bracing elements 4, 5 are located within and outside the tubular or pipe-shaped structure 1. Both the bracing elements within and outside said structure exhibit openings 6 through which ropes may be passed. For lateral drainage of the oil 8 penetrating through slit 2 closed off by means of hydrophobic sheet structure 3 inside the device, internal bracing elements 5 are provided with appropriate passages 7.

Figure 2:
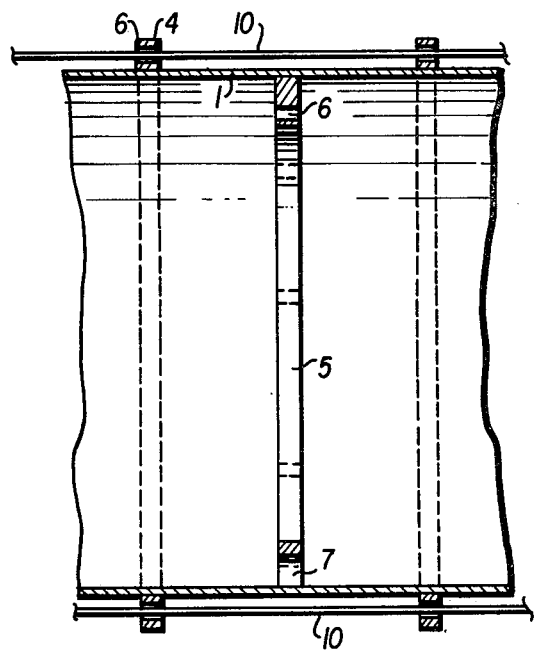
FIG. 2 is a longitudinal cross section along lines II—II of the device of the invention illustrated in FIG. 1.

In FIG. 2, in addition to the features described above and illustrated in FIG. 1, spacing elements 10, which may be ropes, running through upper and lower openings 6 of outside bracing elements 4, serve to align the device longitudinally and also may act as moorings.

In both versions of the device shown in FIG. 1 and FIG. 2, it is also possible to space the bracing elements only outside or only inside the tubular or pipe-shaped structure at a distance from each other. Furthermore, openings 6 may be omitted in the bracing elements. A shift-resistant connection between bracing elements 4, 5 and the tubular or pipe-shaped structure can be achieved by different known methods such as with adhesive or by fusing, etc., taking into account the properties of the materials of which the elements in question are composed. Shifting of the bracing elements may also be prevented by employing the bracing elements 10 as spacing elements running in a longitudinal direction through openings 6. In this case it is generally sufficient to provide for a non-shifting connection between the spacing elements and the tubular or pipe-shaped structure only at both ends of the device of the invention.

Figure 3:
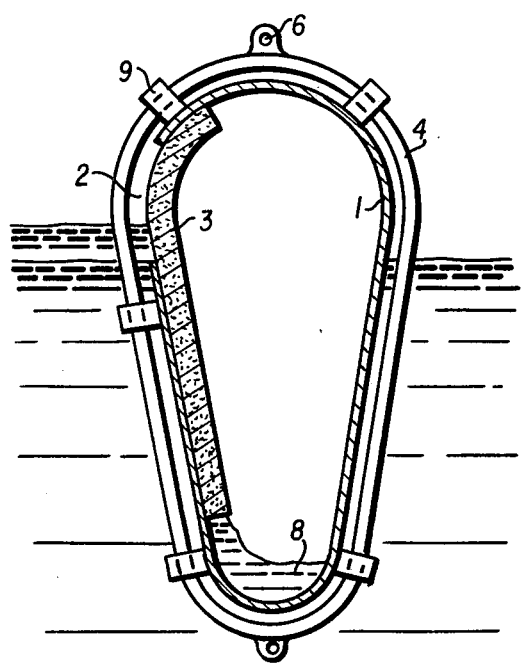
FIG. 3 is a cross section of the device of the invention in which the bracing element is secured by loops to the tubular or pipe-shaped structure.

In the device of the invention shown in FIG. 3, bracing element 4 runs through loops 9 provided on the tubular structure, and is fastened in this manner. In this version, the bracing element is also provided with openings 6 through which bracing elements, e.g. ropes, running in a longitudinal direction, can be inserted.

With the version shown in FIG. 3, it is likewise possible similarly to locate suitably dimensioned bracing elements inside or outside the tubular structure, or both.

Figure 4:
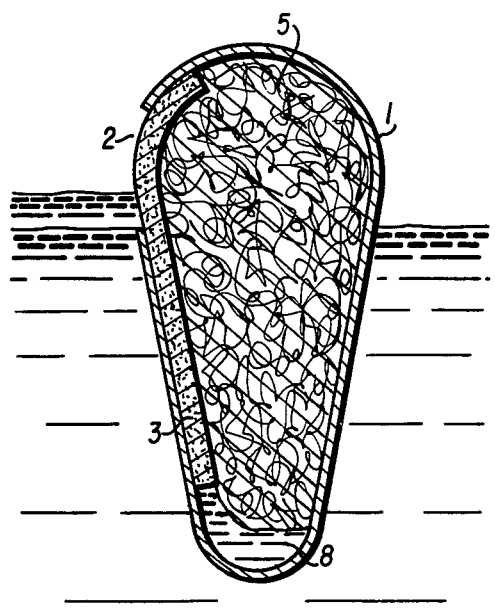
FIG. 4 is a cross section of the device of the invention with a nonwoven element filling the inside space of the device as bracing element.

The version of the device of the invention shown in FIG. 4 proved eminently suitable. Here, bracing element 5 is composed of a nonwoven element consisting of a plurality of intersecting, melt-spun synthetic polymer filaments deposited in loops, which are superficially bonded at their points of intersection. Although such nonwoven element has a certain elasticity and flexibility, it still has sufficient strength to prevent compression or collapsing of the tubular or pipe-shaped structure.

Figure 5:
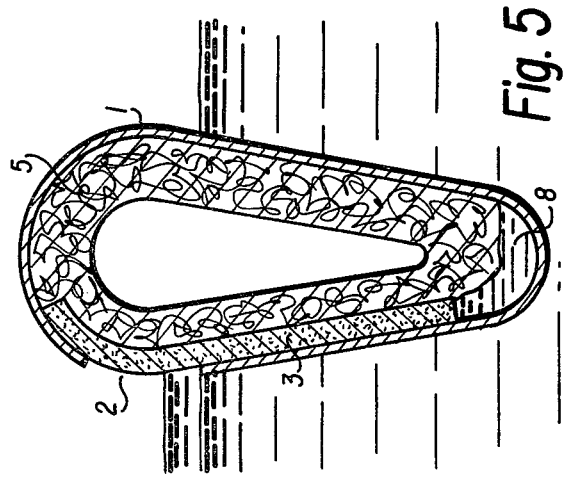
FIG. 5 is a cross section of the device of the invention with a tubular nonwoven element, fitting the inside space of the device, as bracing element.

In the device of the invention shown in FIG. 5, the bracing element is composed of same material as that shown in FIG. 4. However, here bracing element 5 assumes a tubular shape.

Figure 6:
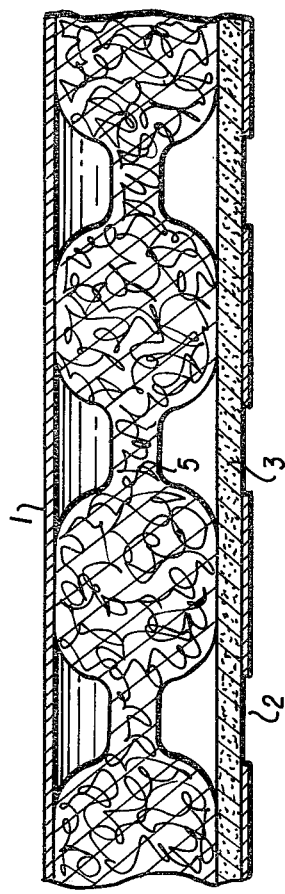
FIG. 6 is a longitudinal cross section of the device of the invention with a bracing body having two different, sectionally alternating diameters.

In the device of the invention shown in longitudinal cross section in FIG. 6, bracing element 5 is composed of the same material as that shown in FIG. 4. However, here bracing element 5 has a sectionally alternating larger and smaller diameter. The admission ports 2 for the liquid to be separated are here located in the segments of the tubular or pipe-shaped structure 1 located opposite the segments of bracing element 5 of smaller diameter.

With this arrangement of bracing elements it is also possible to substitute bracing element 5 shown in FIG. 6 by a similarly shaped air hose.

Figure 7:
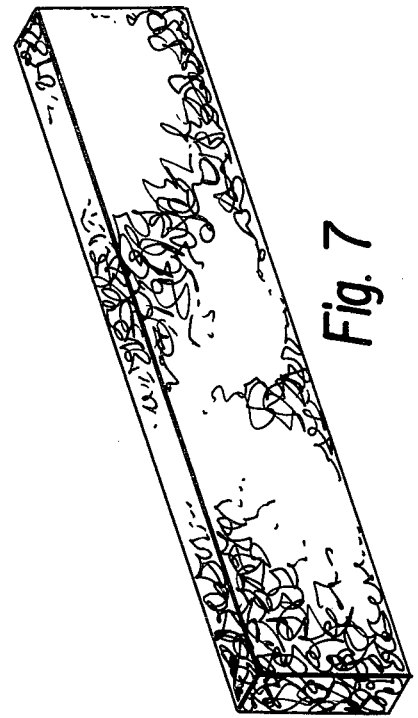
FIG. 7 is a sheet-like nonwoven element used for the bracing elements.

The sheet-like nonwoven element shown in FIG. 7 is composed of a plurality of looped and intersecting melt-spun synthetic polymer filaments, superficially bonded together at their points of intersection. Round, angular, etc. bracing elements can be obtained from such sheet-like nonwoven elements by rolling up, folding, etc., whereby shaping can be accomplished in the presence of heat or in the cold state.

Figure 8:
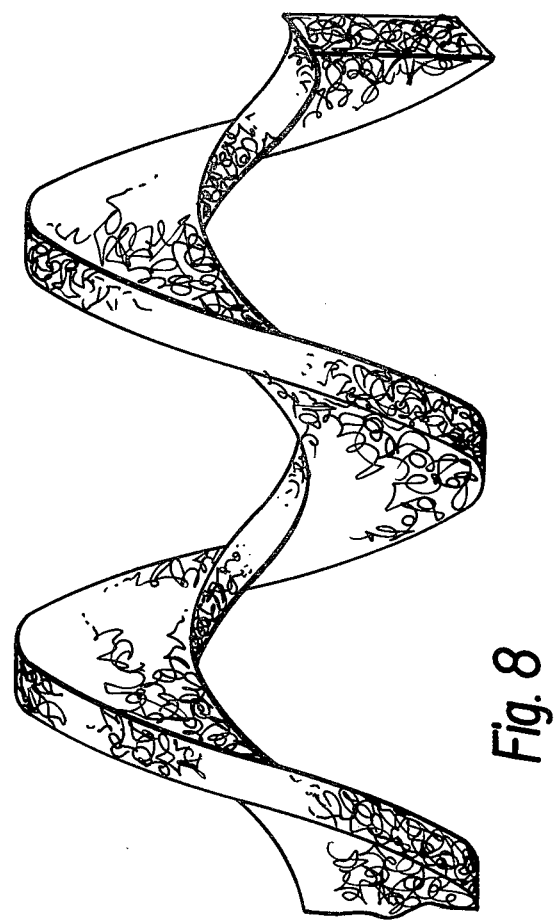
FIG. 8 is a spiral-shaped nonwoven element.

The spiral-shaped bracing element illustrated in FIG. 8 was produced from a sheet-like nonwoven element according to FIG. 7 in the presence of heat.

Figure 9:
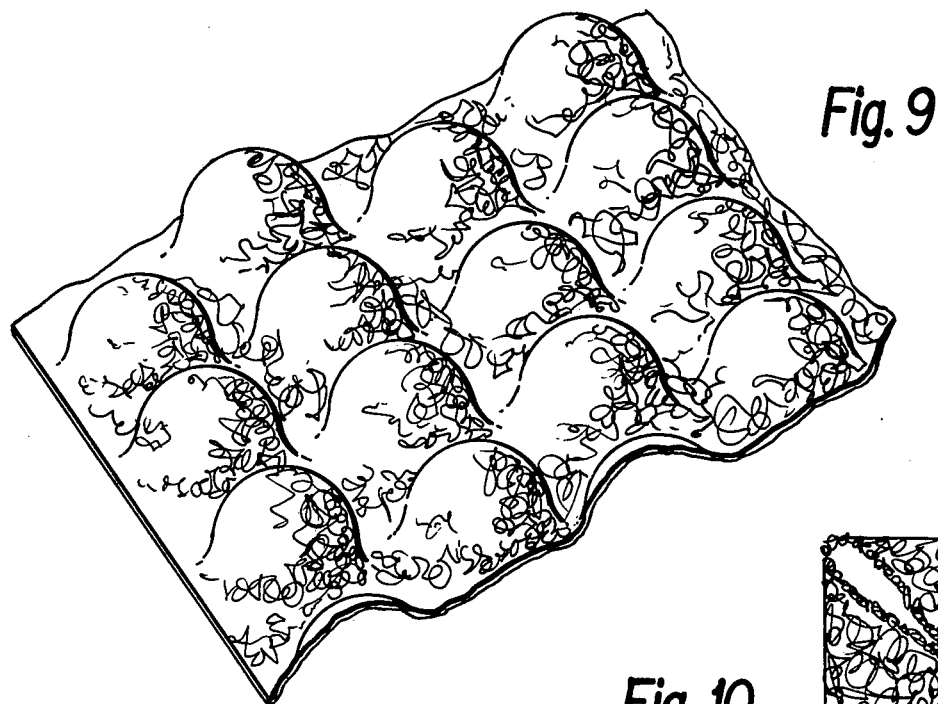
FIG. 9 is a profiled, sheet-like nonwoven element used for the bracing elements.

The sheet-like profiled nonwoven shown in FIG. 9 can be produced both immediately during melt-spinning and by subsequent molding in the presence of heat of a sheet-like nonwoven structure like that shown in FIG. 7.

Figure 10:
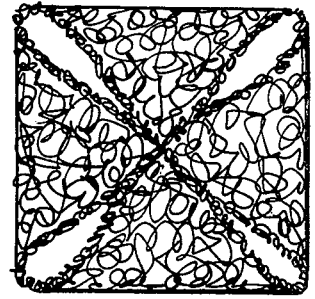
FIG. 10 is the cross section of a bracing element obtained by folding a nonwoven element according to FIG. 9.

The bracing element shown in cross section in FIG. 10 was produced by folding the profiled, sheet-like nonwoven shown in FIG. 9.

Figure 11:
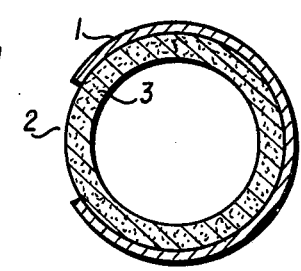
FIG. 11 is the cross section of a device of the invention with a tubular-shaped sheet structure permeable to only one of the liquids to be separated and serving simultaneously as bracing element.

In FIG. 11, showing a cross section of the device of the invention, sheet structure 3 permeable to only one of the liquids to be separated is tubular and had an outside diameter roughly equal to the inside diameter of the tubular or pipe-shaped structure, and hence does simultaneously serve as bracing element.

Figure 12:
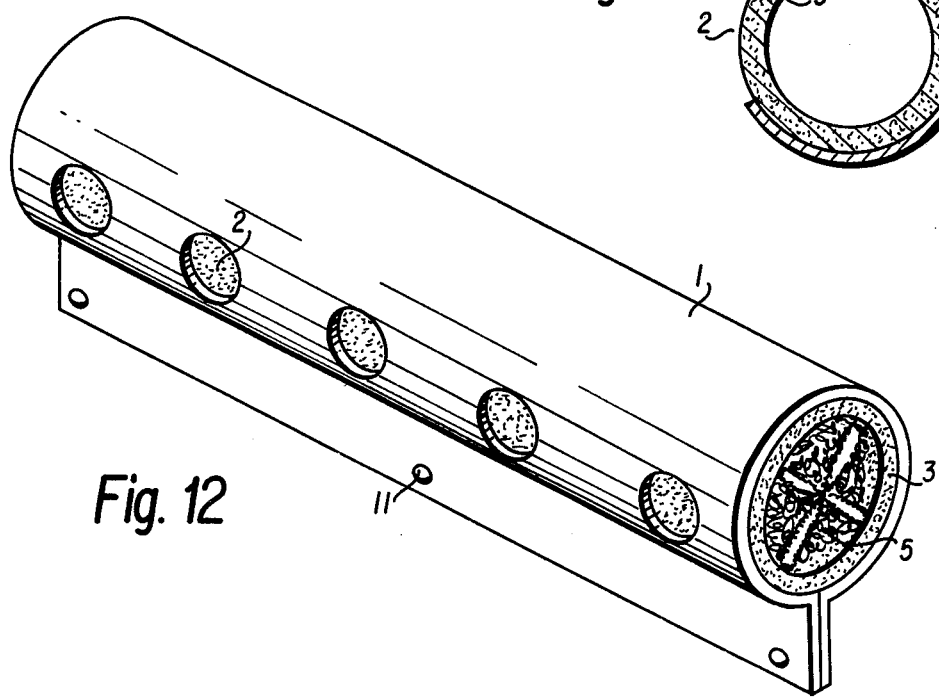
FIG. 12 is a device according to the invention with bracing elements according to FIGS. 10 and 11.

In the prespective view of the device in FIG. 12, a tubular sheet structure 3 permeable to only one of the liquids to be separated, and an element 5 obtained by folding a profiled, sheet-like nonwoven element as shown in FIG. 9, serve as bracing elements. Both bracing elements match the length of the device and are merely inserted into the tubular or pipe-shaped structure 1 of the device. Also shown are admission ports 2 for the liquid to be separated as well as eyelets 11 to secure ballast weights, moorings, etc. to stabilize the device in the stream.

While the invention was described via the example of open channels such as rivers, canals, etc., it is equally suitable for the separation of oil-like or other types of liquids floating on stagnant fluids, lakes, etc., or in tanks or other vessels.

What is claimed is:

1. Device for the separation of mixtures of liquids immiscible in each other, consisting of a tubular or pipe-shaped structure laid out perpendicular to the direction of flow of a fluid stream and provided over its entire length with a discontinuous slit adapted to be disposed so that the width thereof extends above and below the boundary between said immiscible liquids, whereby said slit is closed by a sheet structure permeable to only one of the liquids to be separated and said tubular structure forming a collecting chamber for the said permeable liquid, the improvement comprising bracing means associated with said tubular structure for preventing either compression or collapsing of said structure comprising nonwoven elements located within said tubular or pipe-shaped structure, which nonwovens consist of a plurality of looped, intersecting melt-spun synthetic polymer filaments superficially bonded at their points of intersection.

2. The device of claim 1, wherein said bracing elements are circular and spaced.

3. The device of claim 2, wherein said melt-spun, synthetic polymer filaments have a diameter of 0.1 to 2 mm.

4. The device of claim 3, wherein said melt-spun, synthetic polymer filaments have a diameter of 0.7 to 1.2 mm.

5. The device of claim 1, wherein said bracing elements have a spiral shape.

6. The device of claim 1, wherein said bracing elements are produced by molding, rolling up or folding a sheet-like nonwoven elements.

7. The device of claim 6, wherein said sheet-like nonwoven elements are profiled.

8. The device of claim 4, wherein said bracing elements exhibit a sectionally alternating larger and smaller diameter in the longitudinal direction of the device.

* * * * *